March 3, 1964 J. D. RALPHS 3,123,722

MULTI-CHANNEL VOLTAGE COMPARATORS

Filed Feb. 13, 1961 3 Sheets-Sheet 1

John Dennis Ralphs
Inventor

By Cushman, Darby & Cushman
Attorneys

John Dennis Ralphs
Inventor
By
Cushman, Darby & Cushman
Attorneys

March 3, 1964 J. D. RALPHS 3,123,722

MULTI-CHANNEL VOLTAGE COMPARATORS

Filed Feb. 13, 1961 3 Sheets-Sheet 3

John Dennis Ralphs
*Inventor*

By Cushman, Darby & Cushman
*Attorneys*

3,123,722

MULTI-CHANNEL VOLTAGE COMPARATORS

John Dennis Ralphs, Crowborough, England, assignor to National Research Development Corporation, London, England Filed Feb. 13, 1961, Ser. No. 88,917
Claims priority, application Great Britain Feb. 26, 1960
19 Claims. (Cl. 307—88.5)

The present invention relates to multi-channel voltage comparators of a type suitable for indicating which of a number of input channels to the circuit bears the greatest voltage.

According to the present invention there is provided a multi-channel voltage comparator including a voltage ramp generator for providing a sweep voltage output, a plurality of unilaterally conducting devices each of which connects a separate one of a plurality of voltage inputs to the output of the ramp generator so as to conduct after the output of the ramp generator becomes equal to its associated voltage input and means for detecting which of the unilaterally conducting devices is the first to conduct. If the ramp generator generates a decreasingly negative voltage (an increasingly positive voltage), then it will detect the most negative (least positive) voltage input. Alternatively, if the ramp generator generates a decreasingly positive voltage (an increasingly negative voltage), then it will detect the most positive (lease negative) voltage input.

Preferably, the ramp voltage generator includes a current sawtooth generator transistor having a load resistor connected between its collector and a substantially stable voltage source. The output of the ramp generator is then taken from the collector of this transistor.

Embodiments of the present invention will now be described with reference to the accompanying drawings in which.

Figure 1:
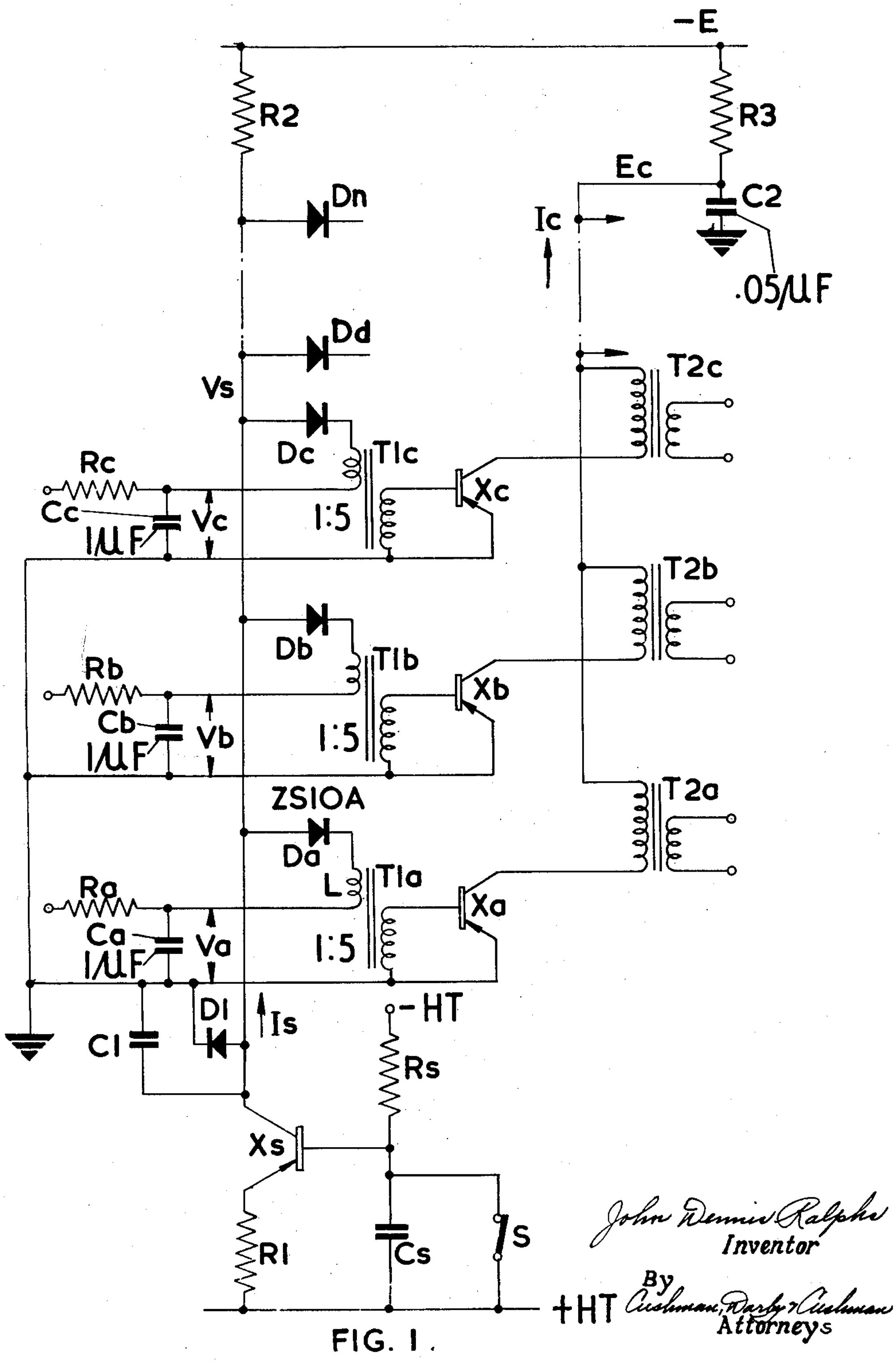
FIGURE 1 is a circuit diagram of a multi-channel voltage comparator circuit.

FIGURE 1 shows a ramp voltage generator in the form of a sawtooth current generator which comprises a transistor X*s* having its base connected to a source of negative voltage through a resistor R*s* and to a source of positive voltage through a capacitor C*s*. A suitable means of periodically discharging the capacitor C*s* is represented in the drawing by a switch S. The emitter of the transsistor X*s* is connected to the source of positive voltage through a resistor R1. The collector of the transistor X*s* is connected to a source of negative voltage through a resistor R2 and to earth through a diode D1 in parallel with a capacitor C1. The anodes of a plurality (say 32) of diodes D*a* to D*n* (that is to say, unilaterally conducting devices) are connected to the collector of the transistor X*s* as indicated. The cathode of each of the diodes D*a* to D*n* is connected through the primary winding of a separate one of a plurality of transformers to a separate voltage input. Three of these transformers T1*a*, T1*b* and T1*c* are shown connected to the diodes D*a*, D*b* and D*c* in the drawing. The voltage inputs comprise separate capacitors, three of which are shown in the drawing as capacitors C*a*, C*b* and C*c*. The voltages across the capacitors are developed from voltages applied to the circuit through resistors such as the resistors R*a*, R*b* and R*c* as shown in the drawing. The secondary windings of the transformers such as T1*a*, T1*b* and T1*c* are connected between the emitters and bases of transistors such as X*a*, X*b* and X*c* as shown in the drawing. The emitters of these transistors are also connected to earth. The collectors of the transistors such as X*a*, X*b* and X*c* are connected to a common line through the primary windings of further transformers such as the transformers T2*a*, T2*b* and T2*c* shown in the drawing. This common line is connected to the source of negative voltage —E through a resistor R3 and to earth through a capacitor C2. The secondary windings of the transformers such as the transformers T2*a*, T2*b* and T2*c* provide the outputs from the circuit.

Figure 2:
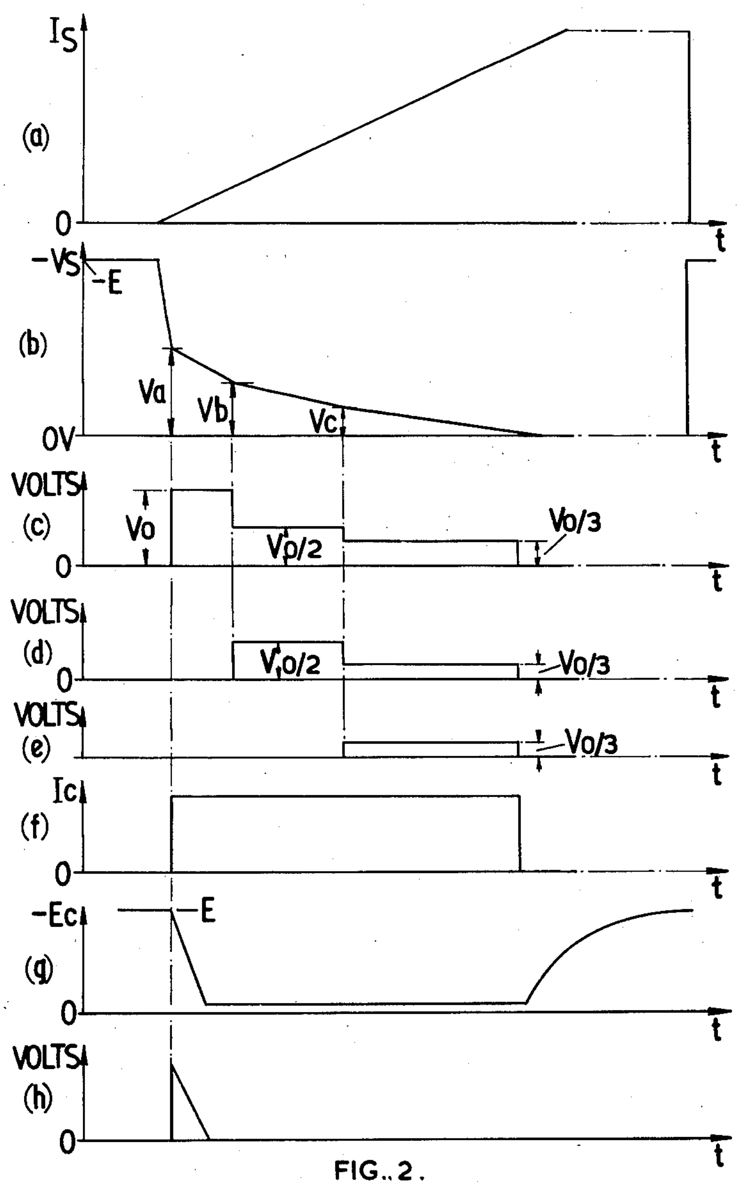
FIGURE 2 is a series of graphical illustrations of idealized wave-forms occurring at various points in the circuit of FIGURE 1

FIGURE 2 shows a number of graphical illustrations of idealized waveforms occurring at various points in the circuit of FIGURE 1. FIGURE 2(*a*) shows the variation of the collector current I*s* through the transistor X*s* with time and FIGURE 2(*b*) shows the variation of the collector voltage —V*s* of the transistor Xs with time. FIGURES 2(*c*), 2(*d*) and 2(*e*) show possible variations in the voltages between the emitters and bases of the transistors X*a*, X*b* and X*c* respectively assuming the voltage inputs V*a*, V*b* and V*c* across the capacitors C*a*, C*b* and C*c* respectively to be of decreasing magnitude relative to one another. FIGURE 2(*f*) shows the variation in the total collector current I*c* taken by the transistors such as the transistors X*a*, X*b* and X*c*. FIGURE 2(*g*) shows a corresponding common collector voltage E*c* of the transistors such as the transistors X*a*, X*b* and X*c* as measured at the junction of the resistor R3 and the capacitor C2. Finally FIGURE 2(*h*) represents the corresponding output voltage from the secondary winding of the transformer T2*a*.

The operation of the circuit will now be explained with reference to FIGURES 1 and 2. Input voltages (say 32 in number) are applied to the capacitors such as the capacitors C*a*, C*b* and C*c* and it will be assumed for the purposes of this explanation that the voltage V*a* developed across capacitor C*a* when fully charged is the most negative of these voltages. It is also assumed that at this time the switch S is closed, the capacitor C*s* is discharged and the transistor X*s* draws no current through its collector. If the switch S is now opened the capacitor C*s* will begin to charge through the resistor R*s* and the collector current through the transistor X*s* will begin to rise substantially as shown in FIGURE 2(*a*). Because of this, the negative collector voltage V*s* of the transistor X*s* will begin to fall as shown in FIGURE 2(*b*). When this ramp voltage sweep falls below the voltage across the capacitor C*a* the diode D*a* will start to conduct resulting in a decreasing rate of fall of the collector voltage of the transistor X*s*. When the diode D*a* conducts a voltage of magnitude V*o* is generated between the emitter and base of the transistor X*a* as shown in FIGURE 2(*c*) so as to cause the transistor X*a* to draw collector current from the capacitor C2 via the primary winding of the transformer T2*a*. This causes the capacitor C2 to discharge almost to earth potential as shown in FIGURE 2(*g*).

The discharge of the capacitor C2 through the primary winding of the transformer T2*a* results in an output pulse from the secondary winding of the transformer T2*a* as shown in FIGURE 2(*h*). After the capacitor C2 has fully discharged, the current through the transistor X*a* is limited to a low value by the resistor R3.

If it be assumed that the voltage V*b* is the next most negative input voltage, then as the current through the transistor X*s* continues to increase and the voltage on the collector of this transistor continues to decrease the diode D*b* will be the next to conduct when the voltage V*b* on the capacitor C*b* is reached. This will result in a further decrease in the rate of change of the collector voltage of the transistor X*s*. The rate of increase of current through the primary winding of the transformer T1*a* is now halved and the voltage developed between the emitter and base of the transistor X*a* is halved to a value of $V_o/2$. The current drawn through the diode Db and the primary of the transformer T1b results in a voltage, of magnitude $V_o/2$ as shown in FIGURE 2(d) being applied between the base and the emitter of the transistor Xb so as to make this transistor conduct. However, as long as the capacitor C2 has had time to discharge nearly to its fullest possible extent the current drawn by the collector of the transistor Xb through the primary winding of the transformer T2b will be small because the voltage Ec at the junction of the resistor R3 and the capacitor C2 will now be low, as shown in FIGURE 2(g) due to current already being drawn by the transistor Xa. There is, therefore, no appreciable output from the transformer T2b. The total current Ic drawn by the transistors Xa and Xb remains substantially constant as shown in FIGURE 2(f).

It will be assumed that as the collector voltage of the transistor Xs continues to fall the next voltage to be reached will be the voltage Vc. Upon this happening, the diode Dc will conduct and a voltage of magnitude $V_o/3$ will be generated between the emitter and base of the transistor Xc, as shown in FIGURE 2(e) so as to cause this transistor to conduct. However, the resulting collector current is insufficient to cause any appreciable output from the secondary winding of the transformer T2c.

It will be seen from FIGURES 2(c), 2(d) and 2(e) that when the diodes Db and Dc conduct in their turn, the output voltages of the transformers T1a and T1b respectively become less than Vo. This is because the collector current of the transistor Xs has to be shared between the resistor R2 and any of the diodes Da to Dn which are conducting. The rate of change of current through any one diode is, therefore, inversely proportional to the number of diodes conducting.

When the collector ramp voltage of the transistor Xs has reached earth voltage the collector is clamped to earth by the diode D1 and the current to the resistor R2 ceases to increase. Thus, the ramp voltage reaches the end of its sweep at earth voltage. By this time all the diodes Da to Dn are conducting and all the capacitors such as Ca to Cc are allowed to become discharged fully. When the diode D1 conducts, the currents through the diodes Da to Dn no longer increase and the transistors such as Xa, Xb and Xc become cut off. However their collector currents are by then so small that no appreciable outputs are generated by the transformers such as T2a, T2b and T2c and such outputs as are developed are of reversed polarity. The switch S is then closed to discharge the capacitor Cs and the cycle of events hereinbefore described may be repeated after a time interval sufficient to allow the capacitors such as C2, Ca, Cb and Cc to charge fully.

It will be seen from the above description that an output is obtained from the secondary winding of only one of the transformers such as the transformers T2a to T2b corresponding to the input to which the highest negative input voltage is applied. The capacitor C1 is not essential to the circuit but is present in this embodiment in order to maintain a substantially linear initial rate of rise of current in the diode Da (or whichever is the first diode to conduct) by compensating for the presence of the primary inductance of the transformer (such as T1a) which would otherwise cause distortion of the leading edge of the output pulse delivered to the base of the transistor (such as the transistor Xa).

When there are a large number of voltage sources connected through resistors (such as the resistor Ra) to transformers (such as the transformer T1a), then the sum of the leakage currents through the correspondingly large number of transistors Xa, Xb et cetera will be high. These leakage currents will be drawn through the resistor R3 and will reduce appreciably the voltage to which the capacitor C2 is charged and will, therefore, reduce the amplitude of any output pulse from a transformer such as the transformer T2a. A similar effect may occur if the ambient temperature is high. In order to overcome this effect, the circuit of FIGURE 1 may be modified as shown in FIGURE 3.

Figure 3:
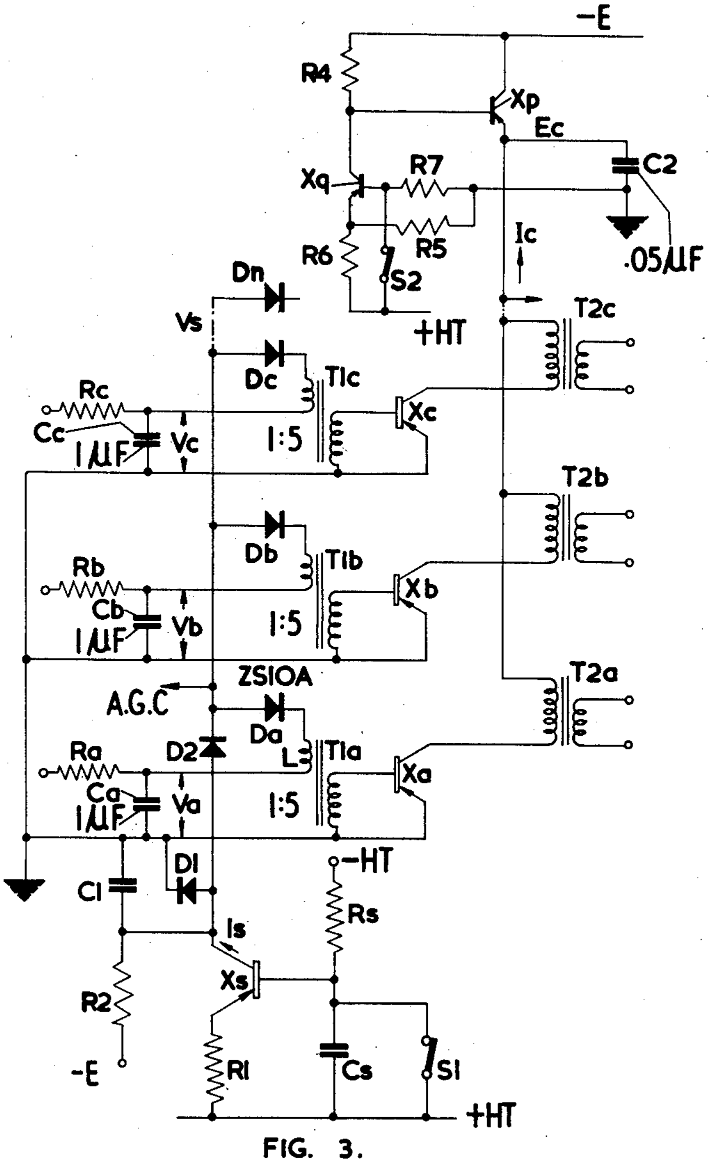
FIGURE 3 is a circuit diagram of a modification of the multi-channel voltage comparator circuit shown in FIGURE 1.

FIGURE 3 is a circuit diagram of a multi-channel voltage comparator many of the components of which have a similar function to those in the circuit of FIGURE 1, although some of these components have been subject to a spatial rearrangement, or have been omitted altogether, in order to make the drawing more clear. Those components in FIGURE 3 which have the same function as those in FIGURE 1 bear the same reference numerals with the exception of the switch S of FIGURE 1 which bears the reference S1 in FIGURE 3. In FIGURE 3, the resistor R3 is omitted and replaced by two transistors Xp and Xq, four resistors R4, R5, R6 and R7 and a switch S2. The transistor Xp has its emitter connected to the capacitor C2, its collector connected to the voltage source −E and its base connected to the voltage source −E through the resistor R4. The base of the transistor Xp is also connected to the collector of the transistor Xq. The base and emitter of the transistor Xq are connected to earth through the resistors R7 and R5 respectively. The base of the transistor Xq is connected to one pole of the switch S2, the other pole of which is connected to positive high tension. The emitter of the transistor Xq is connected to the positive high tension through the resistor R6. In addition, a diode D2 is inserted between the collector of the transistor Xs and the diodes Da, Db et cetera. This diode has no effect on the circuit function as a voltage comparator but may be inserted to enable the circuit to provide an additional output for the purpose of automatic gain control in a manner briefly to be described hereinafter.

The operation of the circuit shown in FIGURE 3 is similar to that described with reference to FIGURES 1 and 2 save for the charging of the capacitor C2. The switches S1 and S2 are operated (for example, by means of a relay) in unison. Therefore, when the switch S1 is closed and the transistor Xs is cut off, the switch S2 is also closed. Under these conditions, the transistor Xq is cut off, thus causing the base voltage of the transistor Xp to rise very nearly to the voltage −E. The transistor Xp is connected as an emitter follower and consequently the capacitor C2 will be charged nearly to the voltage −E. It is not quite charged to the voltage −E because of the small voltage drop across the resistor R4 due to the small base current in the transistor Xp in addition to a small voltage drop between the base and emitter of the transistor Xp. When the switch S1 is opened to start the rise in the current Is, the switch S2 is also opened. The base voltage of the transistor Xq then rises and causes this transistor to draw current through the resistor R4. This results in the base voltage of the transistor Xp to rise to about earth potential so as to cut off the transistor Xp. The capacitor C2 remains charged at nearly −E volts until one of the transistors such as the transistor Xa conducts, the intervening time being insufficiently long to allow appreciable discharge of the capacitor C2. Of course, when the first transistor of the transistors Xa, Xb et cetera conducts, the capacitor C2 will be discharged, thus ensuring that when others of these transistors are rendered conductive, no further appreciable output is obtained.

An alternative, more critical and less satisfactory, arrangement for overcoming the effect of current leakage through the transistors Xa, Xb et cetera is to replace the resistor R3 of FIGURE 1 by an inductance. The circuit values must be chosen in this case to ensure that the capacitor has not recharged in the time interval between the conduction of first transistor to conduct and the conduction of any of the subsequent transistors (Xa, Xb et cetera) which conduct.

The described embodiments of the invention may be employed in a frequency-shift keying telegraphic receiving apparatus in which each character is received as a separate tone. In such an apparatus, the received signal may be applied to a number of sharply tuned amplifiers (not shown) each of which is tuned to a separate character tone frequency. Each amplifier is so constructed that when the tone to which it is tuned is received, its output rises linearly in amplitude at a rate substantially proportional to the amplitude of the received signal. However, when a tone is received to which an amplifier is not tuned, then the amplitude of its output is less than that of the amplifier tuned to the received tone. Such an arrangement of tuned amplifiers is described in U.S. patent specification No. 854,201. The outputs of each of these amplifiers may be rectified and applied to a separate one of the resistors R*a*, R*b* et cetera in FIGURE 3. The diode D2 has been inserted into FIGURE 3 so as to isolate the collector of the transistor X*s* from a line marked A.G.C. when the voltage on the collector is less than any of the input voltages from the tuned amplifiers (not shown). However, when a tone is received, the one diode, of the diodes D*a*, D*b* et cetera, connected to the rectified output of the tuned amplifier corresponding to the tone will conduct first and the corresponding character will be indicated at the output of the corresponding one of the transformers T2*a*, T2*b* et cetera. Further, the predominant component of the voltage output on the line marked A.G.C. will be due to the response of the amplifier tuned to the received tone. The output on the line marked A.G.C. may, therefore, be amplified, filtered and then used to control the gain of the receiver.

In order to ensure that circuits subsequent to the multi-channel voltage discriminators shown in FIGURES 1 and 3 will be operated by only the output of that of the transformers T2*a*,T2*b* et cetera which has the highest output, each of these transformers may be followed by a simple diode voltage amplitude discriminator (not shown) of known type.

The above described embodiments have been described by way of example only and it will be clear to a person skilled in the art that modifications may be made to the embodiments described with reference to FIGURES 1 and 3 without departing from the spirit of the invention. For example, P.N.P. transistors are shown in these figures, but clearly N.P.N transistors may be substituted therefor where appropriate, the signs of the voltages and, if necessary, the senses of connection of the diodes being altered accordingly.

I claim:

1. A multi-channel voltage comparator including a ramp voltage generator for providing a voltage sweep at its output, at least three voltage inputs, a separate one of at least three unilaterally conducting means connected with its conduction path between a separate one of the said voltage inputs and the output of the said ramp generator so as to conduct after the output of the ramp generator has become equal to the voltage at the said separate one of the voltage inputs, a capacitor, means for charging the capacitor prior to each voltage sweep, a separate current-sensitive means connected to each said conduction path and to the said capacitor to cause substantially the complete discharge of the said capacitor substantially immediateely upon the passage of current through the conduction path and means for detecting which of the current-sensitive means causes the said discharge.

2. A multi-channel voltage comparator including a ramp voltage generator for providing a voltage sweep at its output, a plurality of voltage inputs, a plurality of unilaterally conducting means a separate one of which is connected with its conduction path between a separate one of the said votlage inputs and the output of the said ramp generator so as to conduct after the output of the ramp generator has become substantially equal to its associated voltage input, a plurality of transistors, a plurality of transformers a primary winding of a separate one of which is connected in series with the said conduction path of a separate one of the said unilaterally conducting devices and a secondary winding of a separate one of which is connected between the base and emitter of a separate one of the said plurality of transistors in a sense to cause the transistor to become conductive when its associated unilaterally conducting device becomes conductive, a capacitor, means for charging the capacitor before the commencement of each said voltage sweep, means for connecting one electrode of the capacitor to the collector electrodes of the said plurality of transistors and means for detecting which of the said plurality of transistors conducts to discharge the said capacitor.

3. A multi-channel voltage comparator including a ramp voltage generator for providing a voltage sweep at its output, a plurality of voltage inputs, a plurality of unilaterally conducting means a separate one of which is connected with its conduction path between a separate one of the said voltage inputs and the output of the said ramp generator so as to conduct after the output of the ramp generator has become substantially equal to its associated voltage input, a plurality of transistors, a first plurality of transformers a primary winding of a separate one of which is connected in series with the said conduction path of a separate one of the said unilaterally conducting devices and a secondary winding of a separate one of which is connected between the base and emitter of a separate one of the said plurality of transistors in a sense to cause the transistor to become conductive when its associated unilaterally conducting device becomes conductive, a capacitor, means for charging the capacitor before the commencement of each said voltage sweep and a second plurality of transformers a primary winding of a separate one of which is connected between the collector of a separate one of the said plurality of transistors and one electrode of the said capacitor.

4. A multi-channel voltage comparator as claimed in claim 3 and wherein the ramp voltage generator includes a sawtooth current generator transistor and a load resistor connnected between the collector of the said sawtooth current generator transistor and a substantially stable voltage source.

5. A multi-channel voltage comparator as claimed in claim 2 and wherein the ramp voltage generator includes a current sawtooth generator transistor and a load resistor connected between the collector of the transistor and a substantially stable voltage source.

6. A multi-channel voltage comparator as claimed in claim 5 and wherein a further unilaterally conducting means connects the said plurality of unilaterally conducting means to the collector of the said sawtooth generator transistor.

7. A multi-channel voltage comparator as claimed in claim 2 and wherein the means for charging the capacitor is a resistor connected between the said electrode of the capacitor and a substantially stable voltage source.

8. A multi-channel voltage comparator as claimed in claim 2 and wherein the said means for charging the capacitor includes a transistor having its collector connected to a substantially stable voltage source and its emitter connected to the said electrode of the capacitor and means for rendering the transistor conductive before the commencement of each voltage sweep and for rendering the transistor non-conductive during each voltage sweep.

9. A multi-channel voltage comparator as claimed in claim 4 and wherein the means for charging the capacitor is a resistor connected between the said electrode of the capacitor and a substantially stable voltage source.

10. A multi-channel voltage comparator as claimed in claim 4 and wherein the said means for charging the capacitor includes a transistor having its collector connected to a substantially stable voltage source and its emitter connected to the said electrode of the capacitor and means for rendering the transistor conductive before the commencement of each voltage sweep and for rendering the transistor non-conductive during each voltage sweep.

11. A multi-channel voltage comparator including
(a) a constant voltage source,
(b) ramp voltage generator means including (c) an active element and (d) a load connected between the said constant voltage source and the said active element to provide a voltage sweep at the junction of the said load and the said active element,
(e) a plurality of independent voltage inputs,
(f) a separate one of a plurality of unilaterally conducting means connected with its conduction path between a separate one of the said voltage inputs and the said junction so as to conduct during the said voltage sweep after the voltage at the said junction has become equal to the voltage at the said separate one of the voltage inputs, and
(g) current-sensitive means connected into each said conduction path for detecting which of the unilaterally conducting means is the first to conduct.

12. A multi-channel comparator as in claim 11 wherein said (g) detecting means includes:
(h) storage means having two substantially opposite states,
(i) means for changing said storage means substantially to a first one of said states prior to each voltage sweep,
(j) a plurality of separate means connected to said storage means and respectively to said conduction paths for changing said storage means substantially to the other of said states substantially immediately upon the passage of current through the conduction path, and
(k) means for indicating which of the said separate means causes change of said storage means to said other state.

13. A multi-channel voltage comparator as in claim 11 wherein said (g) detecting means includes:
(h) a capacitor,
(i) means for changing the charge on the capacitor in one direction prior to each voltage sweep,
(j) a separate current-sensitive means connected to each said conduction path and to the said capacitor for causing the charge on the capacitor to be changed in the other direction substantially completely and substantially immediately upon the passage of current through the conduction path, and
(k) means for detecting which of the current-sensitive means causes change of the capacitor charge in said other direction.

14. A multi-channel voltage comparator including
(a) a constant voltage source,
(b) a ramp voltage generator means including (c) a transistor and (d) a load connected between the said constant voltage source and the collector of the said transistor, for providing a voltage sweep at the junction of the said load and the said collector,
(e) a plurality of voltage inputs,
(f) a separate one of a plurality of unilaterally conducting means connected with its conduction path between a separate one of the said voltage inputs and the said collector of the said transistor so as to conduct during the said voltage sweep after the voltage of the said collector has become equal to the voltage at the said separate one of the voltage inputs, and
(g) current-sensitive means connected into each said conduction path for detecting which of the unilaterally conducting means is the first to conduct.

15. A multi-channel voltage comparator including
(a) a constant voltage source,
(b) ramp voltage generator means including (c) an active element and (d) a load connected between the said constant voltage source and the said active element to provide a voltage sweep at the junction of the said load and the said active element,
(e) a plurality of voltage inputs, (f) a separate one of a plurality of unilaterally conducting means connected with its conduction path between a separate one of the said voltage inputs and the said junction so as to conduct after the voltage at the said junction has become equal to the voltage at the said separate one of the voltage inputs,
(g) a capacitor,
(h) means for changing the charge on the capacitor in one direction prior to each voltage sweep,
(i) a separate current-sensitive means connected to each said conduction path and to the said capacitor for causing the charge on the said capacitor to be changed in the other direction substantially completely and substantially immediately upon the passage of current through the conduction path, and
(j) means connected to the said current-sensitive means for detecting which of the current-sensitive means causes change of the capacitor charge in the said other direction.

16. A multi-channel voltage comparator including
(a) a constant voltage source,
(b) a transistor,
(c) a load connected between the said constant voltage source and the collector of the transistor,
(d) means connected to the base of the said transistor for causing a current of sawtooth waveform to flow through the collector of the said transistor,
(e) a plurality of inputs,
(f) a separate one of a plurality of unilaterally conducting means connected with its conduction path between a separate one of the said inputs and the collector of the said transistor, so as to conduct when the collector voltage has become equal to the voltage at the said separate one of the said inputs,
(g) a capacitor,
(h) means for changing the charge on the capacitor in one direction prior to each collector current sweep,
(i) a separate current-sensitive means connected to each said conduction path and to the said capacitor for causing the charge on the said capacitor to be changed in the other direction substantially completely and substantially immediately upon the passage of current through the conduction path, and
(j) means connected to the current-sensitive means for detecting which of the current-sensitive means causes change of the capacitor charge in the said other direction.

17. A multi-channel voltage comparator including
(a) a ramp voltage generator for providing a sweep voltage at its output,
(b) at least three voltage inputs,
(c) a separate one of at least three unilaterally conducting means connected with its conduction path between a separate one of the said voltage inputs and the output of the said ramp voltage generator so as to conduct after the output of the ramp voltage generator has become equal to the voltage at the said separate one of the voltage inputs,
(d) a capacitor,
(e) means for changing the charge on the capacitor in one direction prior to each voltage sweep,
(f) a separate current-sensitive means connected to each said conduction path and to the said capacitor for causing the charge on the said capacitor to be changed in the other direction substantially completely and substantially immediately upon the passage of current through the conduction path, and
(g) means for detecting which of the current-sensitive means causes the change in capacitor charge in the said other direction.

18. A multi-channel voltage comparator including
(a) a ramp voltage generator for providing a voltage sweep at its output, (b) a plurality of voltage inputs,
(c) a plurality of unilaterally conducting means a separate one of which is connected with its conduction path between a separate one of the said voltage inputs and the output of the said ramp voltage generator so as to conduct after the output of the ramp voltage generator has become substantially equal to its associated voltage input,
(d) a plurality of transistors,
(e) a plurality of transformers a primary winding of a separate one of which is connected in series with the said conduction path of a separate one of the said unilaterally conducting devices and a secondary winding of a separate one of which is connected between the base and emitter of a separate one of the said plurality of transistors in a sense to cause the transistor to become conductive when its associated unilaterally conducting device becomes conductive,
(f) a capacitor,
(g) means for changing the charge on the capacitor in one direction before the commencement of each said voltage sweep,
(h) means for connecting one electrode of the capacitor to the collector electrodes of the said plurality of transistors, and
(i) means for detecting which of the said plurality of transistors conducts to change the charge on the capacitor in the other direction.

19. A multi-channel voltage comparator including
(a) a ramp voltage generator for providing a voltage sweep at its output,
(b) a plurality of voltage inputs, (c) a plurality of unilaterally conducting means a separate one of which is connected with its conduction path between a separate one of the said voltage inputs and the output of the said ramp voltage generator so as to conduct after the output of the ramp voltage generator has become substantially equal to its associated voltage input,
(d) a plurality of transistors,
(e) a plurality of transformers a primary winding of a separate one of which is connected in series with the said conduction path of a separate one of the said unilaterally conducting devices and a secondary winding of a separate one of which is connected between the base and emitter of a separate one of the said plurality of transistors in a sense to cause the transistor to become conductive when its associated unilaterally conducting device becomes conductive,
(f) a capacitor,
(g) means for changing the charge on the capacitor before the commencement of each said voltage sweep, and
(h) a second plurality of transformers a primary winding of a separate one of which is connected between the collector of a separate one of the said plurality of transistors and one electrode of the said capacitor.

References Cited in the file of this patent

UNITED STATES PATENTS

| | | |
|---|---|---|
| 2,579,852 | Olson | Dec. 25, 1951 |
| 2,954,502 | Carpenter et al. | Sept. 27, 1960 |
| 2,974,286 | Meyer | Mar. 7, 1961 |
| 2,991,372 | Blocher | July 4, 1961 |